US008359357B2

(12) United States Patent
Rodriguez et al.

(10) Patent No.: US 8,359,357 B2
(45) Date of Patent: Jan. 22, 2013

(54) SECURE E-MAIL MESSAGING SYSTEM

(75) Inventors: Ricardo J. Rodriguez, Palmetto, FL (US); Jay J. Visaria, Pinellas Park, FL (US); Jerry L. Pippins, Jr., Parrish, FL (US); Tina A. Oberai, Tampa, FL (US); Thomas D. Farley, Wimauma, FL (US); Noah Z. Stahl, St. Petersburg, FL (US)

(73) Assignee: Raytheon Company, Waltham, MA (US)

( * ) Notice: Subject to any disclaimer, the term of this patent is extended or adjusted under 35 U.S.C. 154(b) by 603 days.

(21) Appl. No.: 12/176,935

(22) Filed: Jul. 21, 2008

(65) Prior Publication Data
US 2010/0017598 A1 Jan. 21, 2010

(51) Int. Cl.
G06F 15/16 (2006.01)
H04L 29/06 (2006.01)
(52) U.S. Cl. .................. 709/206; 713/150; 713/153
(58) Field of Classification Search .................. 713/150, 713/153–156; 709/204–207; 726/27, 30
See application file for complete search history.

(56) References Cited

U.S. PATENT DOCUMENTS

| 6,085,324 | A | 7/2000 | Ogram |
| 6,367,013 | B1 * | 4/2002 | Bisbee et al. ................ 713/178 |
| 7,096,254 | B2 * | 8/2006 | Awada et al. ................ 709/206 |
| 7,120,927 | B1 * | 10/2006 | Beyda et al. ........................ 726/2 |
| 7,127,741 | B2 * | 10/2006 | Bandini et al. ................. 726/14 |
| 7,131,000 | B2 | 10/2006 | Bradee |
| 7,174,363 | B1 | 2/2007 | Goldstein et al. |
| 7,293,171 | B2 * | 11/2007 | Batthish et al. ............... 713/152 |
| 7,308,101 | B2 | 12/2007 | Wing |
| 7,328,351 | B2 * | 2/2008 | Yokota et al. ................. 713/189 |
| 7,346,923 | B2 | 3/2008 | Atkins et al. |

(Continued)

FOREIGN PATENT DOCUMENTS
EP 1 280 316 1/2003
EP 1 635 524 A1 3/2006
(Continued)

OTHER PUBLICATIONS

Eran Gabber, Phillip B. Gibbons, Yossi Matias and Alain Mayer, "How to make personalized web browsing simple, secure, and anonymous", Financial Cryptography Lecture Notes in Computer Science, 1997, vol. 1318/1997, 17-31, [retrieved on Aug. 25, 2011 from SpringerLink database].*

(Continued)

*Primary Examiner* — Saleh Najjar
*Assistant Examiner* — Lashanya Nash
(74) *Attorney, Agent, or Firm* — Schwegman Lundberg & Woessner, P.A.

(57) ABSTRACT

According to one embodiment, a secure e-mail messaging system includes an e-mail relay server coupled to a secure client configured on a secure domain and an external client configured on an external domain. The e-mail relay server has a memory for storage of an actual address of the secure client, a first certificate associated with the actual address, an alias address associated with the actual address, and a second certificate associated with the alias address. The e-mail relay server receives an e-mail message that includes the alias address from the external client and decrypts the e-mail message according to the second certificate. The e-mail messaging server then replaces the alias address with the actual address to form a modified e-mail message, encrypts the modified e-mail message according to the first certificate, and transmits the modified e-mail message to the secure client.

24 Claims, 2 Drawing Sheets

U.S. PATENT DOCUMENTS

| | | | |
|---|---|---|---|
| 7,444,672 | B2 | 10/2008 | Ellmore |
| 7,451,163 | B2 | 11/2008 | Selman et al. |
| 7,467,399 | B2 | 12/2008 | Nadalin et al. |
| 7,472,413 | B1 | 12/2008 | Mowshowitz |
| 7,505,482 | B2 | 3/2009 | Adamczyk et al. |
| 7,571,473 | B1 | 8/2009 | Boydstun et al. |
| 7,640,427 | B2 * | 12/2009 | Callas et al. ............... 713/153 |
| 7,689,832 | B2 * | 3/2010 | Talmor et al. ............... 713/186 |
| 2002/0169874 | A1 | 11/2002 | Batson et al. |
| 2003/0126558 | A1 | 7/2003 | Griffin |
| 2003/0163733 | A1 | 8/2003 | Barriga-Caceres et al. |
| 2003/0188167 | A1* | 10/2003 | Kurosaki et al. ............. 713/176 |
| 2004/0111519 | A1 | 6/2004 | Fu et al. |
| 2004/0230831 | A1 | 11/2004 | Spelman et al. |
| 2005/0044197 | A1 | 2/2005 | Lai |
| 2005/0132070 | A1 | 6/2005 | Redlich et al. |
| 2005/0149496 | A1 | 7/2005 | Mukherjee et al. |
| 2005/0198412 | A1 | 9/2005 | Pedersen et al. |
| 2006/0236365 | A1 | 10/2006 | Pham |
| 2007/0245409 | A1 | 10/2007 | Harris et al. |
| 2007/0250921 | A1 | 10/2007 | LiVecchi |
| 2008/0072290 | A1 | 3/2008 | Metzer et al. |
| 2008/0126799 | A1 | 5/2008 | Winig |
| 2009/0319782 | A1 | 12/2009 | Lee |
| 2010/0146608 | A1 | 6/2010 | Batie et al. |

FOREIGN PATENT DOCUMENTS

| | | |
|---|---|---|
| EP | 1635524 A1 | 3/2006 |
| GB | 2 421 156 | 6/2006 |
| WO | WO 2005/096543 | 10/2005 |
| WO | WO-2005/096543 A1 | 10/2005 |

OTHER PUBLICATIONS

Alberto Escudero Pascual, "Anonymous and Untraceable Communications With the aim of using computer networks as a political art", Jun. 21, 2000 [retrieved from Citeseer database "http://citeseer.ist.psu.edu/viewdoc/summary?doi=10.1.1.22.1314" on Dec. 15, 2011].*

Irvin L. Dean, et al., Secure Network Portal, U.S. Appl. No. 12/145,363, filed Jun. 24, 2008.

Notification of Transmittal of the International Search Report and the Written Opinion of the International Searching Authority, or the Declaration for PCT/US2009/047588 (12 pages), Oct. 23, 2009.

Notification of Transmittal of the International Search Report and the Written Opinion of the International Searching Authority, or the Declaration for PCT/US2009/043684, Mar. 5, 2010.

Notification of Transmittal of the International Search Report and the Written Opinion of the International Searching Authority, or the Declaration for PCT/US2009/049485, Dec. 7, 2009.

Intellectual Property Office, South Wales, NP10 8QQ; Examination Report under section 18(3); re: Application No. GB1100172.4, Apr. 21, 2011.

Intellectual Property Office, South Wales, NP10 8QQ; Examination Report under section 18(3); re: Application No. GB1100172.4; dated Oct. 5, 2011; 3 pages.

Notification of Transmittal of the International Search Report and the Written Opinion of the International Searching Authority, or the Declaration for PCT/US2009/063021, Feb. 25, 2010.

USPTO Office Action for U.S. Appl. No. 12/145,363, Apr. 1, 2011.

Response to non-final OA mailed Jun. 30, 2011 for U.S. Appl. No. 12/145,363, Jun. 30, 2011.

USPTO Office Action for U.S. Appl. No. 12/145,363, Oct. 4, 2011.

USPTO Office Action for U.S. Appl. No. 12/496,444, Sep. 20, 2010.

USPTO Office Action for U.S. Appl. No. 12/496,444, Mar. 10, 2011.

USPTO Response to Office Action for U.S. Appl. No. 12/496,444 mailed Mar. 10, 2011, May 10, 2011.

USPTO Advisory Action for U.S. Appl. No. 12/496,444, May 25, 2011.

USPTO Pre Appeal Brief for U.S. Appl. No. 12/496,444, Jun. 10, 2011.

USPTO Decision for U.S. Appl. No. 12/496,444, Aug. 17, 2011.

USPTO Appeal Brief for U.S. Appl. No. 12/496,444, Sep. 19, 2011.

USPTO Examiner's Answer for U.S. Appl. No. 12/496,444, Nov. 14, 2011.

Response to non-final OA mailed Mar. 10, 2011 for U.S. Appl. No. 12/496,444, May 10, 2011.

U.S. Appl. No. 12/496,444 , Dickson et al., Multi-Level Secure Network, Jul. 1, 2009.

USPTO Office Action for U.S. Appl. No. 12/329,407, May 19, 2011.

USPTO Office Action for U.S. Appl. No. 12/329,407, Nov. 2, 2011.

U.S. Appl. No. 12/329,407; DelRocco et al., Multi-Level Secure Information Retrieval System, Dec. 5, 2008.

Manual, "Protecting Sensitive Compartmented Information Within Information Systems (Dcid 6/3)—Manual," Table of Contents through 9.G.7, for Official Use Only, May 24, 2000.

Brochure, "Digital Small Switch" (DSS-2A), Raytheon, St. Petersburg, Florida, 2006.

R. Housley, Vigil Security: "Using Advanced Encryption Standard (AES) CCM Mode with IPsec Encapsulating Security Payload (ESP)"; rfc 4309.txt, IETF Standard, Internet Engineering Task Force, IETF, CH, Dec. 1, 2005.

"Application Serial No. 1100457.9, Office Action mailed Jan. 23, 2012", 2 pgs.

"U.S. Appl. No. 12/176,935, Response filed Jan. 30, 2011 to Final Office Action mailed Sep. 8, 2011", 14 pgs.

"United Kingdom Application No. 1100457.9, Office Action mailed Apr. 27, 2012", 2 pgs.

"United Kingdom Application Serial No. 1100457.9, Response filed Mar. 21, 2012 to Office Action mailed Jan. 23, 2012", 15 pgs.

"International Application Serial No. PCT/US2009/047588, International Preliminary Report on Patentability mailed Jan. 25, 2011", 6 pgs.

"International Application Serial No. PCT/US2009/047588, International Search Report mailed Oct. 23, 2009", 3 pgs.

"International Application Serial No. PCT/US2009/047588, Written Opinion mailed Oct. 23, 2009", 5 pgs.

"United Kingdom Application Serial No. 1100457.9, Response filed Jun. 12, 2012 to Office Action mailed Apr. 27, 2012", 13 pgs.

* cited by examiner

SECURE E-MAIL MESSAGING SYSTEM

TECHNICAL FIELD OF THE DISCLOSURE

This disclosure generally relates to communication systems, and more particularly, to an e-mail messaging system and a method of operating the same.

BACKGROUND OF THE DISCLOSURE

Many network computing systems use a distributed architecture in which individual computers may be communicate with one another using various communication protocols, such as an Ethernet or token ring protocol. Computing systems configured in networks may provide particular advantages over those configured in traditional centralized computing architectures. For example, computing systems configured in networks may provide an efficient means of communication with one another. Organizations often use network computing systems that are configured in one or more domains to handle many of their organizational processes.

SUMMARY OF THE DISCLOSURE

According to one embodiment, a secure e-mail messaging system includes an e-mail relay server coupled to a secure client configured on a secure domain and an external client configured on an external domain. The e-mail relay server has a memory for storage of an actual address of the secure client, a first certificate associated with the actual address, an alias address associated with the actual address, and a second certificate associated with the alias address. The e-mail relay server receives an e-mail message that includes the alias address from the external client and decrypts the e-mail message according to the second certificate. The e-mail messaging server then replaces the alias address with the actual address to form a modified e-mail message, encrypts the modified e-mail message according to the first certificate, and transmits the modified e-mail message to the secure client.

Some embodiments of the disclosure may provide numerous technical advantages. For example, one embodiment of the secure e-mail messaging system provides enhanced security over other known e-mail messaging systems. Using the secure e-mail messaging system of the present disclosure, e-mail messages may be transmitted between domains while hiding sensitive information, such as the domain structure of either domain involved in the e-mail transaction.

Certificates may be used enhance the security of e-mail communications. These certificates, however, may include sensitive information about the domain structure that may form a breach of security. Certain embodiments of the secure e-mail messaging system hides certificates associated with clients configured on the secure domain from other clients configured on external domains to enhance the security of secure domain.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

As described previously, organizations often use network computing systems to handle many of their organizational processes. Network computing systems used by organizations may be structured in domains for ease of administration by maintenance personnel. These network computing systems may also be coupled to publicly accessible networks, such as the Internet, to extend their processing capability to other organizations. For example, organizations may be coupled together through the Internet to provide various communication services between organizations, such as e-mail messaging services, voice services, and/or instant messaging services.

Organizations often use information that may be confidential in nature. Due to the generally insecure nature of commonly known network architectures, organizations seek to manage the nature and type of information that may be shared externally with others. The United States Department of Defense (DoD), for example, has issued a Director of Central Intelligence Directive 6/3 (DCID 6/3) entitled "Protecting Sensitive Compartmented Information Within Information Systems." The Director of Central Intelligence Directive 6/3 generally includes a set of guidelines including several ascending levels of protection that extend from a protection level 0 (PL0) to a protection level 5 (PL5).

The protection level 4 (PL4) protection level specifies that "The security support structure shall maintain separate execution domains (e.g., address spaces) for each executing process." This requirement has not heretofore been possible using known e-mail messaging mechanisms or protocols. That is, known e-mail messaging protocols utilize a header structure including a sender's address portion and a recipient address portion that may be generally unalterable following creation of the e-mail message. Access to the sender's address portion and/or recipient address portion may create a breach of security, a problem that may not be solved using known e-mail messaging systems.

Figure 1:
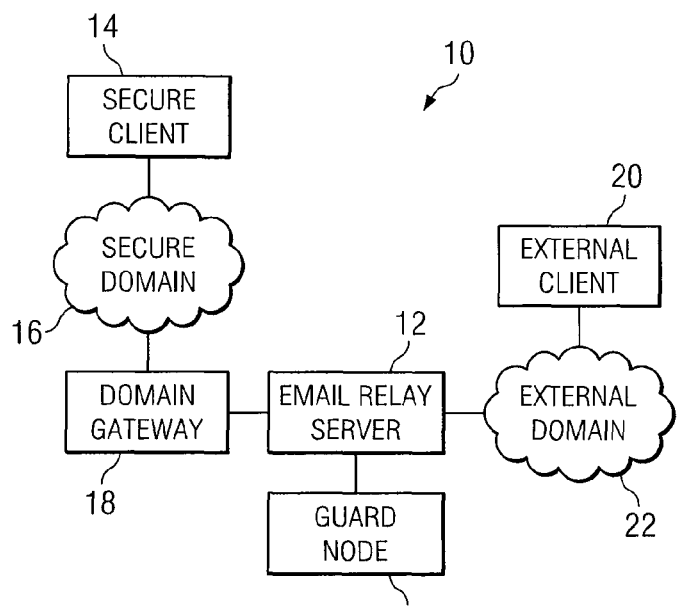
FIG. 1 is a block diagram showing one embodiment of a secure e-mail messaging system according to the teachings of the present disclosure.

FIG. 1 shows one embodiment of a secure e-mail messaging system 10 that may provide a solution to this problem as well as other problems. Secure e-mail messaging system 10 includes an e-mail relay server 12 that couples a secure client 14 configured on a secure domain 16 through a domain gateway 18 with an external client 20 configured on an external domain 22. E-mail relay server 12 is also coupled to a guard node 24. According to the teachings of the present disclosure, e-mail relay server 12 separates secure domain 16 from external domain 22 by isolating the domain structure of secure domain 16 from external domain 22. That is, provisions are made for e-mail communication of secure client 14 with external client 20 without revealing the domain structure of secure domain 16.

Secure domain 16 may be any type of network computing system that maintains a secure environment from external domain 22. Secure domain 16 may include, for example, a network computing system of an organization, such as the Department of Defense (DoD) that handles confidential information as part of its organizational processes. External domain 22 may be any other computing system, such as a stand-alone computing system, a distributed computing system, or other network computing system, such as the Internet or an intranet of another organization. In one embodiment, secure domain 16 and external domain 22 are administered by a single organization that administers communication with differing levels of security. For example, the Department of Defense may implement secure domain 16 to have a "top secret" security level and external domain 22 to have a "secret" security level. In other embodiments, secure domain 16 and external domain 22 may form a portion of an organization, such as the Department of Defense, having multi-tiered levels of security in which various domains that are separated from one another according to various corresponding caveats or sub-security levels.

E-mail relay server 12 separates secure domain 16 from any external domain 22 as described above. In this respect, the term "separated" refers to the quality of hiding the domain structure of secure domain 16 from external domain 22 and/or isolating certificates issued within secure domain 16 from those issued to external domain 22. Use of the domain structure within the e-mail message may provide benefits for the organization if used internally. For example, administrators may diagnose faults in a relatively efficient manner using the domain structure information included in e-mail messages. This information, however, may compromise the security of secure domain 16 if allowed access by others outside of secure domain 16. Access to certificates issued within secure domain 16 by users from external domains 22 may also provide a breach of security. Certificates typically include information to verify the identity and address information of secure clients 14 configured on secure domain 16. Knowledge of this information may therefore be detrimental to the security of secure domain 16. Thus, e-mail relay server 12 separates secure domain 16 from external domain 22 by hiding the address of secure client 14 and any certificates associated with secure client 14.

Secure client 14 and external client 20 may include any suitable type of e-mail client that transmits or receives e-mail messages, such as Mozilla Thunderbird, Microsoft Mail, or Pegasus Mail. Secure client 14 transmits or receives e-mail messages to or from, respectively, another secure client configured on secure domain 16 or external client 20 configured on external domain 22. Domain gateway 18 may be provided to route e-mail messages between secure domain 16 and external domain 22. In one embodiment, domain gateway 18 includes an adjudicator device that regulates communication services of secure clients 14 in secure domain 16 to those in external domain 22. In another embodiment, domain gateway 18 configured as an adjudicator restricts information received by or transmitted from secure client 14 in a compartmented fashion according to a protection level 3 (PL3) protection level. For example, domain gateway 18 may restrict access by secure client 14 or external client 20 to published information according to a security level of the respective client. According to this example, domain gateway 18 may negotiate a login session with secure client 14 or external client 20, and subsequently allow access to information according to a security level of the login session.

Guard node 24 is executed on any suitable computer having a processor that executes instructions stored in a memory. Guard node 24 verifies e-mail messages processed by e-mail relay server 12. Upon receipt of e-mail messages, e-mail relay server 12 decrypts the e-mail messages and forwards the decrypted e-mail messages to guard node 24 for verification. Guard node 24 may verify e-mail messages according to one or more rules. Verification of e-mail messages may trap various malicious intruder attempts to gain illicit access to secure domain 16. For example, guard node 24 may compare sender or recipient addresses included in the e-mail messages and reject any that are suspicious. In one embodiment, guard node 24 searches the body portion of e-mail messages for suspicious or illicit content. For example, the body portion of e-mail messages may be searched, such as with a regular expression search, to determine if content is found that may be inconsistent with the security level of the sender or recipient. If malicious or illicit content is found, the message may be restricted from being forwarded to the recipient address.

Figure 2:
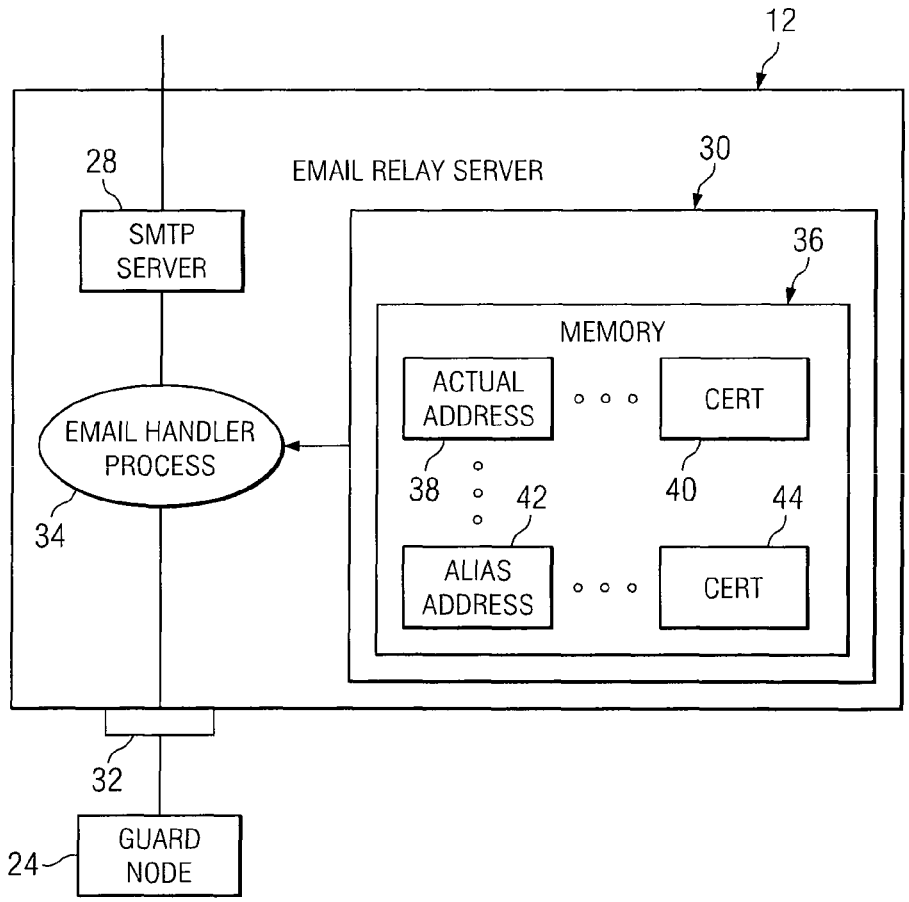
FIG. 2 is a diagram showing several elements of one embodiment of an e-mail relay server that may be used with the secure e-mail messaging system of FIG. 1.

FIG. 2 is a diagram showing several elements of one embodiment of an e-mail relay server 12 that may be used with the secure e-mail messaging system 10 of FIG. 1. E-mail relay server 12 may be implemented on any suitable computing system, such as a personal computer, a laptop computer, a workstation, or a network of multiple computers configured on a local area network (LAN). E-mail relay server 12 includes a simple mail transport protocol (SMTP) server 28, a memory 30, and a port 32 for communication with guard node 24. E-mail relay server 12 also executes an e-mail handler process 34 that executes instructions stored in memory 30. Operation of, e-mail handler process 34 will be described in detail below.

Simple mail transport protocol server 28 is coupled to secure domain 16 and external domain 22 for relaying e-mail messages between one another. In one embodiment, e-mail relay server 12 includes multiple simple mail transport protocol servers 28 that are each individually coupled to secure domain 16 and external domain 22. In the particular embodiment shown, simple mail transport protocol server 28 communicates with secure domain 16 and external domain 22 using a simple mail transport protocol; however, any suitable e-mail messaging protocol may be used, such as a post office protocol (POP) or an Internet message access protocol (IMAP).

Memory 30 stores an account 36 for each secure client 14 registered on secure domain 16. Account 36 may be generated due to registration of secure client 14 and prior to communication of secure client 14 with external client 20. Each account 36 includes an actual address 38 of secure client 14. Upon registration, a certificate 40 is generated to provide secure communication within secure domain 16. An alias address 42 is also generated and bound to actual address 38 such that, when an e-mail message is sent to or from secure domain 16, e-mail handler process 34 may associate actual address 38 with alias address 42. Certificate 40 may include identifiable information about secure client 14. Providing access to certificate 40 may create a breach of security whereby illicit users may obtain information about secure client 14. Thus, certificate 44 is generated to provide secure communication of alias address 42 with external client 20 while alleviating the need to subject certificate 40 to use outside of secure domain 16.

Port 32, which couples e-mail relay server 12 to guard node 24, may be any suitable type of communication port, such as an Ethernet port or other suitable data communication port. In one embodiment, port 32 includes a queue for temporary storage of e-mail messages between guard node 24 and e-mail handler process 34. In one embodiment, e-mail messages conveyed between e-mail handler process 34 and guard node 24 may be wrapped in an extensible markup language (XML) message to facilitate parsing of information by guard node 24. In another embodiment, e-mail messages or extensible markup language messages encapsulating the e-mail messages may be encrypted prior to being transmitted to or from port 32.

Modifications, additions, or omissions may be made to secure e-mail messaging system 10 without departing from the scope of the disclosure. The components of secure e-mail messaging system 10 may be integrated or separated. For example, the functions of guard node 24 may be integrated with e-mail handler process 34 on e-mail relay server 12. Additionally, operations of e-mail relay server 12 may be performed using any suitable logic comprising software, hardware, and/or other logic. As used in this document, "each" refers to each member of a set or each member of a subset of a set.

Figure 3:
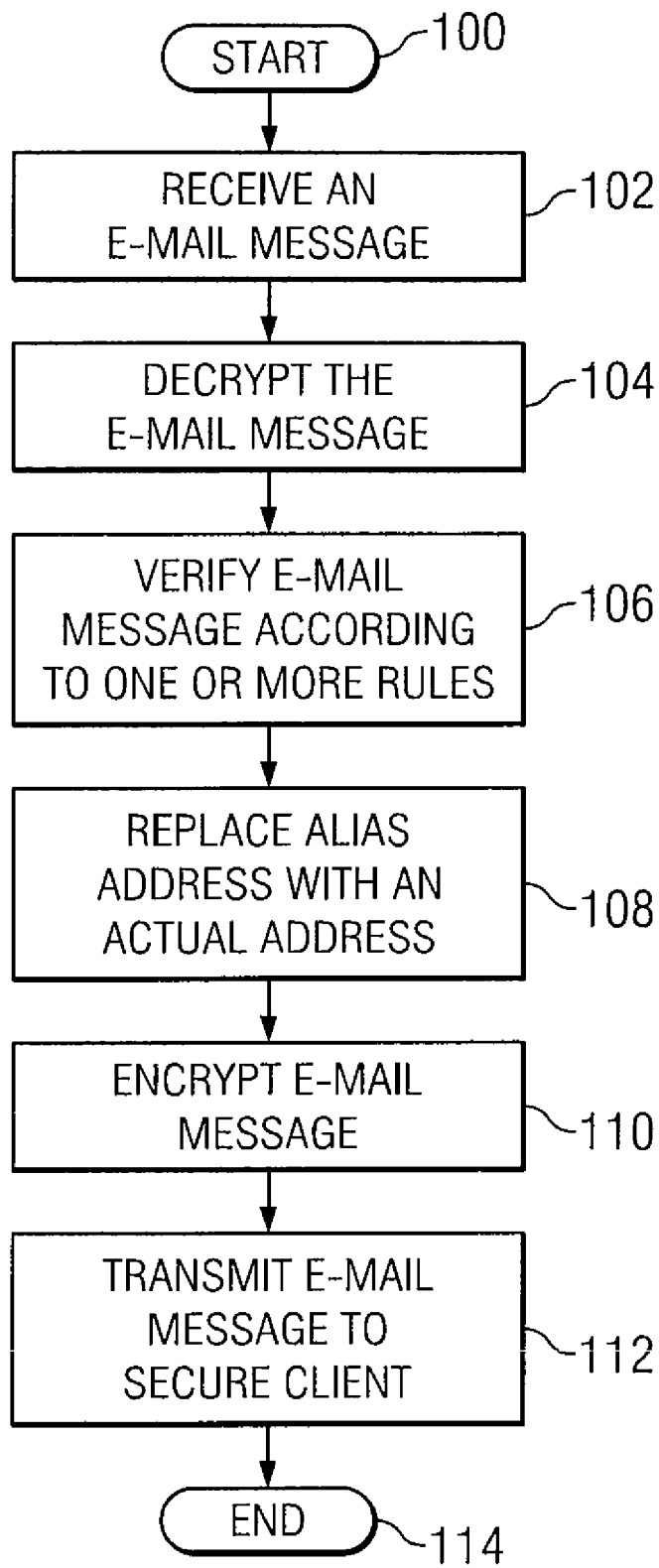
FIG. 3 is a flowchart showing one embodiment of a series of actions that may be performed by the e-mail handler process of FIG. 2 to transfer e-mail messages from the external domain to the secure domain of FIG. 1.

FIG. 3 is a flowchart showing one embodiment of a series of actions that may be performed by e-mail handler process 34 to transfer e-mail messages from external domain 22 to secure domain 16. In act 100, the process is initiated.

In act 102, e-mail handler process 34 receives an e-mail message from external client 20 configured on external domain 22. The e-mail message has several fields, such as a sender's address, a recipient address, and a body portion that includes text, graphics, or other useful information intended for view by secure client 14. An alias address is provided to external client 20 rather than the actual e-mail address of secure client 14 in order to hide the domain structure from view outside of secure domain 16. Thus, the recipient address includes alias address 42 of secure client 14. The e-mail message may be encrypted using any suitable approach.

In act 104, e-mail handler process 34 decrypts the e-mail message according to certificate 44 associated with alias address 42. Certificate 44 is issued to external client 20 for encrypting e-mail message prior to transmission. In one embodiment, e-mail message is decrypted according to a certificate 44 that includes a public key associated with alias address 42 and a private key associated with external client 20. The public key may be used to ensure the privacy of the e-mail message while the private key verifies the signature of external client 20.

In act 106, e-mail handler process 34 verifies e-mail message according to one or more rules. The quantity and type of rules may include any rule that ensures particular procedures are followed to maintain security of secure domain 16. For example, a particular rule may check the e-mail message to ensure that the domain structure is not included in the recipient address of the e-mail message. As another example, e-mail handler process 34 may perform a general search of the body portion of the e-mail message for particular words or phrases that may be inappropriate for view outside of secure domain 16. If any of the rules are violated, other measures may be taken, such as deletion of the e-mail message, quarantining of the e-mail message, or alerting management personnel of the suspect e-mail message.

In one embodiment, elements of the e-mail message may be transmitted to guard node 24 for verifying the e-mail message according to the one or more rules. In this embodiment, e-mail handler process 34 wraps the e-mail message in an extensible markup language (XML) message and transmits the extensible markup language message to guard node 24. Certain embodiments in which rules are verified using a guard node 24 that is separate from e-mail relay server 12 may provide an advantage in that administration of the one or more rules may be simplified using a independently managed computing system.

In act 108, e-mail handler process 34 replaces the alias address 42 with the actual address 38 in the recipient address portion of the e-mail message.

In act 110, e-mail handler process 34 encrypts the modified e-mail message according to another certificate 40 associated with actual address 38. In one embodiment, certificate 40 includes a public key of actual address 38 and a private key of alias address 42. The public key of actual address 38 may be used to ensure privacy of the e-mail message while the private key of the alias address may be used to sign the message. That is, the private key may be used to verify the identity of secure client 14 such that the originator of the e-mail message was not spoofed by an illicit user.

In act 112, the encrypted e-mail message is transmitted to secure client 14 using the actual address 38.

The previously described process may be repeated with each e-mail message transmitted from an external client 20 to secure client 14. To transmit an e-mail message from secure client 14 to external client 20, the previously described process may be reversed. In act 114, the process ends.

Modifications, additions, or omissions may be made to the method without departing from the scope of the invention. The method may include more, fewer, or other acts. For example, the e-mail message may be encrypted prior to transmission or receipt from e-mail relay server 12 to guard node 24. In this manner, security of the e-mail message may be maintained throughout the transmission path of e-mail messages.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A secure e-mail messaging system comprising:
an e-mail relay server coupled to a secure client configured on a secure domain and an external client configured on an external domain, the e-mail relay server having a memory for storage of an actual address of the secure client, a first certificate associated with the actual address, an alias address associated with the actual address, and a second certificate associated with the alias address, the actual address including domain structure information of the secure domain, the first certificate including a public key of the actual address and a private key of the alias address, and the second certificate including a public key of the alias address and a private key of the external client, the e-mail relay server operable to:
receive an e-mail message comprising the alias address as a recipient from the external client, the alias address comprising a local part and domain structure information of the external domain, both the local part and the domain structure information of the external domain of the alias address being devoid of the domain structure information of the secure domain, the e-mail message being encrypted according to the public key of the alias address and the e-mail message being encrypted according to the private key of the external client for a first signature, the public key of the alias address and the private key of the external client being extracted from the second certificate previously issued to the external client;
decrypt the e-mail message according to the second certificate, the decrypting including verifying whether the e-mail message has the first signature of the external client, the verifying including decrypting the e-mail message according to a public key of the external client accessible to the e-mail relay server;
replace the alias address with the actual address of the secure client as the recipient to form a modified e-mail message;
encrypt the modified e-mail message according to the public key of the actual address and encrypt the modified e-mail message according to the private key of the alias address for a second signature, the public key of the actual address and the private key of the alias address being extracted from the first certificate; and
transmit the modified e-mail message to the secure client as encrypted according to the public key of the actual address and signed according to the private key of the alias address.

2. The secure e-mail messaging system of claim 1, wherein the e-mail relay server is further operable to:
receive another e-mail message comprising the actual address from the secure client;
encrypt the another e-mail message according to the first certificate;
replace the actual address with the alias address to form another modified e-mail message;
encrypt the another modified e-mail message according to the second certificate; and
transmit the another modified e-mail message to the external client.

3. The secure e-mail messaging system of claim 1, wherein the e-mail relay server is operable to decrypt the e-mail message according to the second certificate by decrypting the e-mail message according to a private key of the alias address.

4. The secure e-mail messaging system of claim 1, wherein the secure domain comprises a secure network having a security level that differs from the security level of the external domain.

5. The secure e-mail messaging system of claim 1, wherein the first certificate is isolated from the external domain and wherein the second certificate is isolated from the secure domain.

6. The secure e-mail messaging system of claim 1, further comprising a guard node coupled to the e-mail relay server, the guard node operable to verify the e-mail message according to a plurality of rules.

7. The secure e-mail messaging system of claim 6, wherein the guard node is operable to verify the first e-mail message by searching the body portion for instances of one of a plurality of key phrases or one of a plurality of keywords and if found, restrict the e-mail relay server from transmitting the modified e-mail message.

8. The secure e-mail messaging system of claim 1, wherein e-mail relay server is coupled to the secure client through a domain gateway, the domain gateway operable to compartment information transmitted from the secure domain to the external domain.

9. A secure e-mail messaging method comprising:
receiving, by a network device, an e-mail message comprising an alias address as a recipient from an external client configured on an external domain, the alias address associated with an actual address of a secure client configured on a secure network, the e-mail message being encrypted according to a public key of the alias address and the e-mail being encrypted according to a private key of the external client for a first signature, the public key of the alias address and the private key of the external client being extracted from a second certificate associated with the alias address, the second certificate previously issued to the external client;
decrypting, by a network device, the e-mail message according to the stored second certificate, the decrypting including verifying whether the e-mail message has the first signature of the external client, the verifying including decrypting the e-mail message according to a public key of the external client;
replacing, by a network device, the alias address with the actual address of the secure client as the recipient to form a modified e-mail message, the actual address including domain structure information of the secure network, the alias address comprising a local part and domain structure information of the external domain, both the local part and the domain structure information of the external domain of the alias address being devoid of the domain structure information of the secure network;
encrypting, by a network device, the modified e-mail message according to a public key of the actual address and encrypting the modified e-mail message according to a private key of the alias address for a second signature, the public key of the actual address and the private key of the alias address being extracted from a stored first certificate associated with the actual address; and
transmitting, by a network device, the modified e-mail message to the secure client as encrypted according to the public key of the actual address and signed according to the private key of the alias address.

10. The secure e-mail messaging method of claim 9, further comprising:
receiving another e-mail message comprising the actual address from the secure client;
encrypting the another e-mail message according to the first certificate;
replacing the actual address with the alias address to form another modified e-mail message;
encrypting the another modified e-mail message according to the second certificate, and transmitting the another modified e-mail message to the external client.

11. The secure e-mail messaging method of claim 9, wherein decrypting the e-mail message according to the second certificate further comprises:
decrypting the e-mail message according to a private key of the alias address.

12. The secure e-mail messaging method of claim 9, wherein the external domain has a security level that differs from the security level of the secure domain.

13. The secure e-mail messaging method of claim 9, wherein the first certificate is isolated from the external domain.

14. The secure e-mail messaging method of claim 9, further comprising:
verifying the e-mail message according to a plurality of rules.

15. The secure e-mail messaging method of claim 14, wherein verifying the e-mail message according to the plurality of rules comprises:
searching the body portion for instances of one of a plurality of key phrases or one of a plurality of keywords and if found, restricting an e-mail relay server receiving the e-mail message from transmitting the modified e-mail message.

16. The secure e-mail messaging method of claim 9, further comprising:
compartmenting information that is transmitted from the secure domain to the external domain.

17. A non-transitory computer-readable medium having code stored thereon, the code operable, when executed on a computer processor, to perform at least the following:

receive an e-mail message comprising an alias address as a recipient from an external client configured on an external domain, the alias address associated with an actual address of a secure client configured on a secure network, the actual address including domain structure information of the secure network, the alias address comprising a local part and domain structure information of the external domain, both the local part and the domain structure information of the external domain of the alias address being devoid of the domain structure information of the secure network, the e-mail message being encrypted according to a public key of the alias address and the e-mail being encrypted according to the private key of the external client for a first signature, the public key of the alias address and the private key of the external client being extracted from a second certificate associated with the alias address, the second certificate previously issued to the external client;

decrypt the e-mail message according to the stored second certificate, the decrypting including verifying whether the e-mail message has the first signature of the external client, the verifying including decrypting the e-mail message according to a public key of the external client;

replace the alias address with the actual address of the secure client as the recipient to form a modified e-mail message;

encrypt the modified e-mail message according to a public key of the actual address and encrypt the modified e-mail message according to a private key of the alias address for a second signature, the public key of the actual address and the private key of the alias address being extracted from a stored first certificate associated with the actual address; and transmit the modified e-mail message to the secure client as encrypted according to the public key of the actual address and signed according to the private key of the alias address.

18. The non-transitory computer-readable medium of claim 17, the code further operable, when executed on the computer processor, to:

receive another e-mail message comprising the actual address from the secure client;

encrypt the another e-mail message according to the first certificate;

replace the actual address with the alias address to form another modified e-mail message;

encrypt the another modified e-mail message according to the second certificate and transmit the another modified e-mail message to the external client.

19. The non-transitory computer-readable medium of claim 17, the code further operable, when executed on the computer processor, to:

decrypt the e-mail message according to a private key of the alias address.

20. The non-transitory computer-readable medium of claim 17, wherein the external domain has a security level that differs from the security level of the secure domain.

21. The non-transitory computer-readable medium of claim 17, wherein the first certificate is isolated from the external domain.

22. The non-transitory computer-readable medium of claim 17, the code further operable, when executed on the computer processor, to:

verify the e-mail message according to a plurality of rules.

23. The non-transitory computer-readable medium of claim 22, wherein to verify the e-mail message according to the plurality of rules comprises:

searching the body portion for instances of one of a plurality of key phrases or one of a plurality of keywords and if found, restricting an e-mail relay server receiving the e-mail message from transmitting the modified e-mail message.

24. The non-transitory computer-readable medium of claim 17, the code further operable, when executed on the computer processor, to:

compartment information that is transmitted from the secure domain to the external domain.

* * * * *

UNITED STATES PATENT AND TRADEMARK OFFICE
CERTIFICATE OF CORRECTION

PATENT NO. : 8,359,357 B2  
APPLICATION NO. : 12/176935  
DATED : January 22, 2013  
INVENTOR(S) : Rodriguez et al.

Page 1 of 1

It is certified that error appears in the above-identified patent and that said Letters Patent is hereby corrected as shown below:

On Title page 2, in column 2, References Cited, under "Other Publications", line 39, delete "Jan." and insert --Nov.--, therefor In the Specifications  
In column 4, line 26, delete "of," and inset --of--, therefor In the Claim  
In column 10, line 8, in Claim 18, delete "certificate" and insert --certificate;--, therefor Signed and Sealed this  
Seventh Day of January, 2014

Margaret A. Focarino  
*Commissioner for Patents of the United States Patent and Trademark Office*